United States Patent [19]

Braathen

[11] Patent Number: 4,691,348
[45] Date of Patent: Sep. 1, 1987

[54] TWO WAY TELEPHONE COMMUNICATION SYSTEM

[75] Inventor: Russell E. Braathen, Calgary, Canada

[73] Assignee: Novatel Communications Ltd., Calgary, Canada

[21] Appl. No.: 730,590

[22] Filed: May 6, 1985

[30] Foreign Application Priority Data

Oct. 30, 1984 [CA] Canada ................................ 466643

[51] Int. Cl.$^4$ ............................................. H04M 9/08
[52] U.S. Cl. ...................................... 379/389; 379/388
[58] Field of Search ................ 179/81 B, 81 R, 100 L, 179/170.2, 170.6, 170.8; 379/388, 389, 390, 420, 406

[56] References Cited

U.S. PATENT DOCUMENTS

| | | | |
|---|---|---|---|
| 3,751,602 | 8/1973 | Breeden | 379/390 |
| 3,925,618 | 12/1975 | Kato et al. | 179/81 B |
| 3,952,166 | 4/1976 | Kato et al. | 179/81 B |
| 3,970,786 | 7/1976 | Randmere | 179/81 B |
| 4,052,562 | 10/1977 | Andersen | 179/100 L X |
| 4,490,582 | 12/1984 | Munson | 179/81 B |
| 4,542,263 | 9/1985 | Mitani | 179/81 B |

*Primary Examiner*—Gene Z. Rubinson
*Assistant Examiner*—R. Vaas
*Attorney, Agent, or Firm*—Sim & McBurney

[57] ABSTRACT

A two way telephone communication system includes a station having a signal transmitting channel for conveying a signal received at a microphone to another station, a signal receiving channel for conveying signals received from the other station to a speaker, and switches permitting the two signal channels to be selectively enabled or disabled. Two signal detection paths are associated with the transmitting and receiving channels, each containing circuitry which detects the presence of signals in one of the channels and responds by generating actuating signals. Control circuitry responds to the detection path which first generates an actuating signal by enabling its associated signal channel and simultaneously disabling the other signal channel, triggering the switches appropriately. Delay circuitry associated with each signal detection path can be selectively enabled to delay the generation of an actuating signal in the associated signal detection path. The delay circuitry of the signal detection path associated with the disabled signal channel is enabled so long as signals are present in the enabled signal channel. This arrangement tends to maintain the enabled signal channel until it is no longer required to convey signals.

8 Claims, 12 Drawing Figures

TWO WAY TELEPHONE COMMUNICATION SYSTEM

BACKGROUND OF THE INVENTION

This invention relates to two way telephone communications systems. More specifically, this invention relates, in its preferred embodiment, to what could be referred to as an automatic direction decision system for a two way telephone communications system, particularly, but not necessarily, of the hands-free type.

As it now will be necessary to refer to the appended drawings, these first will be described briefly.

Figure 1:
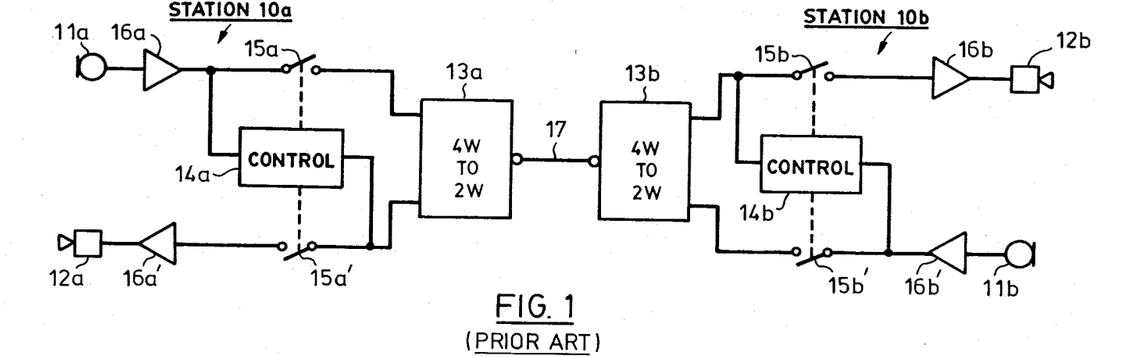
FIGS. 1 and 2 illustrate prior art, hands-free telephone systems.

FIG. 1 shows a typical, prior art, hands-free telephone system having the same components at each of two stations 10a and 10b. Since the components at the two stations are identical, they will be assigned identical reference numerals in the following description but followed by "a" or "b" depending upon whether the components are at station 10a or at station 10b respectively. Thus, at stations 10a, 10b there are microphones 11a, 11b; loudspeakers 12a, 12b; four wire to two wire converters 13a, 13b; control circuits 14a, 14b; switches 15a, 15a', 15b, 15b' and amplifiers 16a, 16a', 16b, 16b' all connected as shown in FIG. 1.

Control circuits 14a, 14b control switches 15a, 15a' and switches 15b, 15b' respectively.

Four wire to two wire converters 13a and 13b are connected by a two wire communications line 17.

With the system shown in FIG. 1 operating ideally, a mode of operation which, from a practical point of view is not possible to attain, when a voice signal is received by microphone 11a, its presence is detected and causes control circuitry 14a to close switch 15a and open switch 15a' preventing this voice signal from being broadcast by speaker 12a, and the voice signal is transmitted via line 17 to station 10b where it is broadcast by loudspeaker 12b. At that station the presence of a voice signal from station 10a is detected and causes control circuitry 14b to close switch 15b and open switch 15b', preventing any voice signals received by microphone 11b from being transmitted to station 10a and enabling loudspeaker 12b to broadcast the voice signal received from station 10a.

Unfortunately systems of the type shown in FIG. 1 exhibit a phenomenon known as "echo", whereby a voice signal received by microphone 11a, for example, will be "echoed" to loudspeaker 12a and then picked up by microphone 11a. It is possible in some systems for a signal indicating presence of the "echo" to reach control circuitry 14a before a signal indicating presence of the voice signal at microphone 11a creating a "race" condition. Under these circumstances control circuitry 14a will open switch 15a and close switch 15a', producing an entirely unsatisfactory result.

Figure 2:
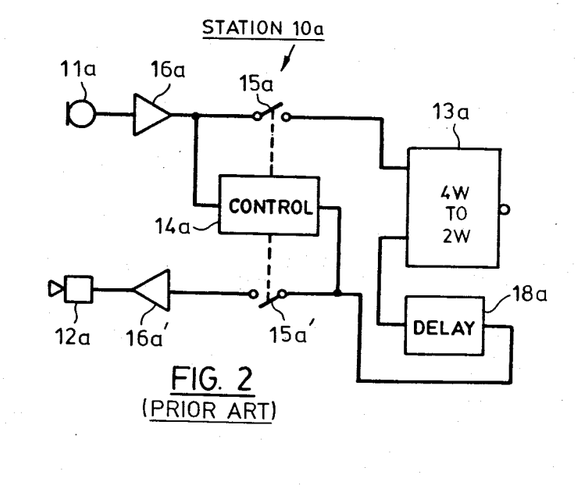

One known technique for avoiding this problem is shown in FIG. 2, which shows only station 10a, station 10b being identical, and in which station 10a is the same as in FIG. 1 except for the inclusion of a delay network 18a in the signal path. This delay network always delays any signal on the line to loudspeaker 12a, including the "echo" signal, and prevents control circuitry 14a from being responsive to a signal indicating presence of the "echo", since it will be received by control circuitry 14a after reception of a signal indicating presence of the voice signal at microphone 11a. The problem with introduction of any form of delay into the signal path is that distortion is introduced thereby.

SUMMARY OF THE INVENTION

In accordance with the present invention there is provided an automatic direction decision system which functions like an ideally functioning system of the type shown in FIG. 1 and which obviates the distortion problem created by the addition of delay network 18a (FIG. 2) that compensates for the fact that the system of FIG. 1 cannot operate in the ideal mode previously discussed.

In its broadest sense the instant invention resides in introduction of delay into the signal detection path rather than into the signal path itself, as in the case of the system shown in FIG. 2.

An aspect of the invention is as follows:

In a two way telephone communication system including a first station having a first signal receiving source, a second signal receiving source, signal broadcasting means, a first signal path connected to said first signal receiving source for transmitting a signal received by said first signal receiving source to a location for transmission of said signal to another station, a second signal path connected between said second signal receiving source and said signal broadcasting means for carrying a signal received by said second signal receiving source from another station to said signal broadcasting means, switching means in each of said signal paths for selectively enabling one of said signal paths and disabling the other of said signal paths, control means for controlling said switching means, signal detection paths connected between said first signal path and said control means and between said second signal path and said control means for detecting the presence of signals in said first and second signal paths and for activating said cohtrol means to control said switching means responsive to the one of said signals in said signal detecting paths first received by said control means, the improvement comprising signal delay means in at least one of said signal detection paths, and means responsive to the presence of a signal in one of said signal paths for selectively enabling or disabling said signal delay means.

DETAILED DESCRIPTION OF THE INVENTION INCLUDING THE PREFERRED EMBODIMENT

Figure 3:
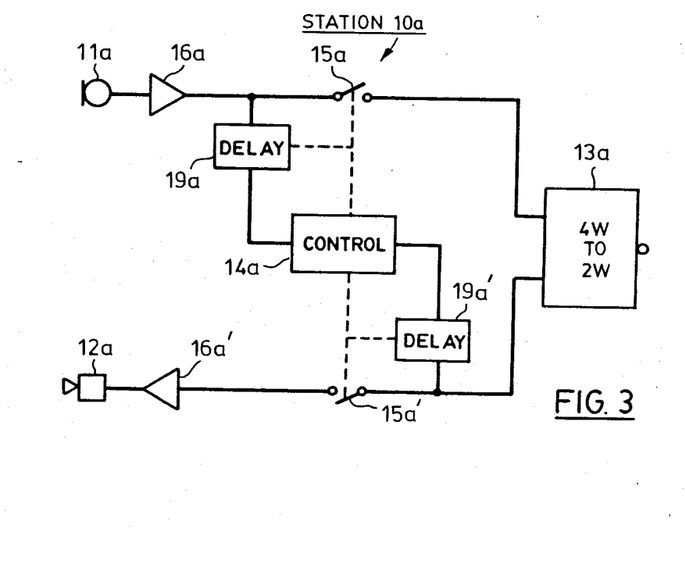
FIG. 3 is a schematic representation of one station of a two-way telephone communication system embodying the present invention.

An embodiment of the invention is shown in FIG. 3. FIG. 3 shows only station 10a, and it will be understood that station 10b will be identical. The system of FIG. 3 differs from that of FIG. 2 in that there is no signal distorting delay network 18a in the signal path. Rather, delay networks 19a and 19a' are provided in the signal detection path, i.e., in the path wherein the presence of a signal in the signal path is detected and used to control the state of control circuit 14a and hence of switches 15a, 15a'.

Figure 4:
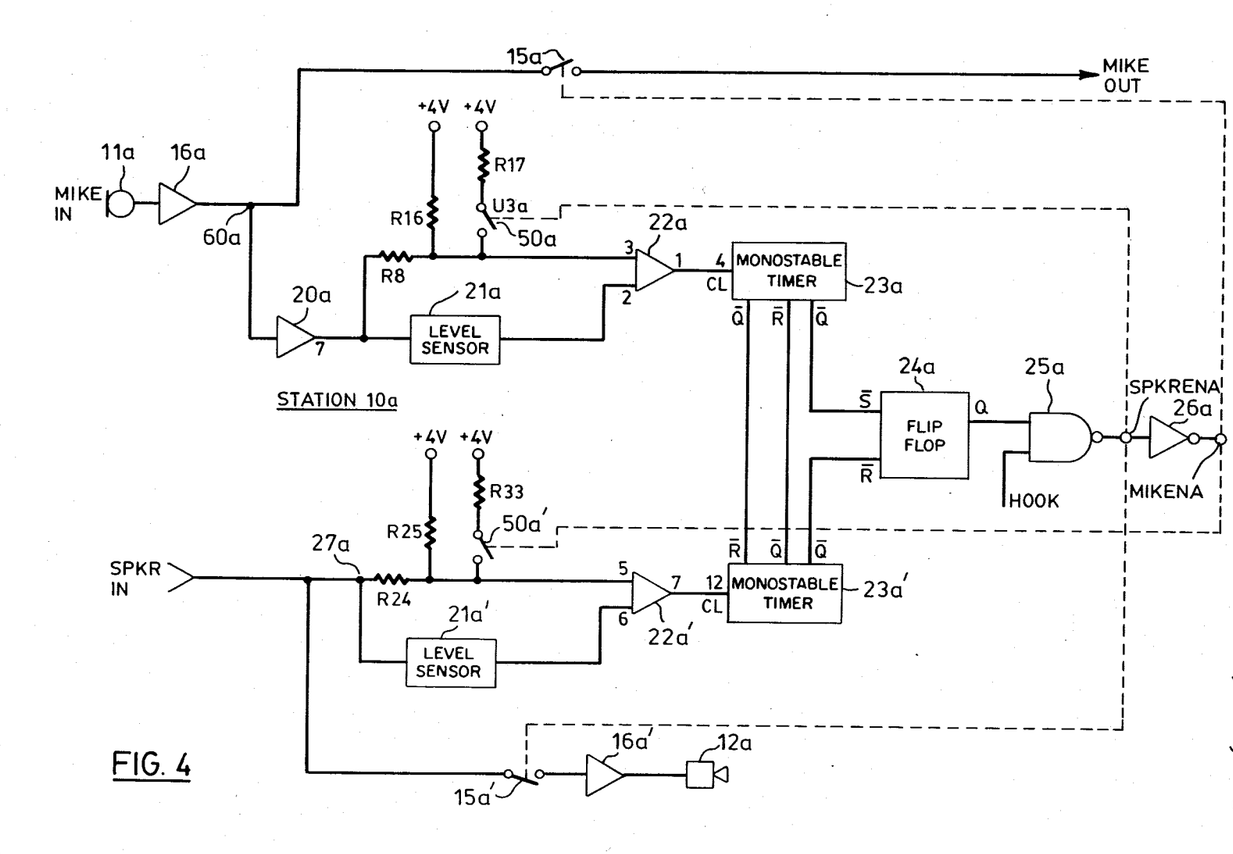
FIG. 4 is a block diagram of an automatic direction decision system embodying the present invention.
Figure 5A:
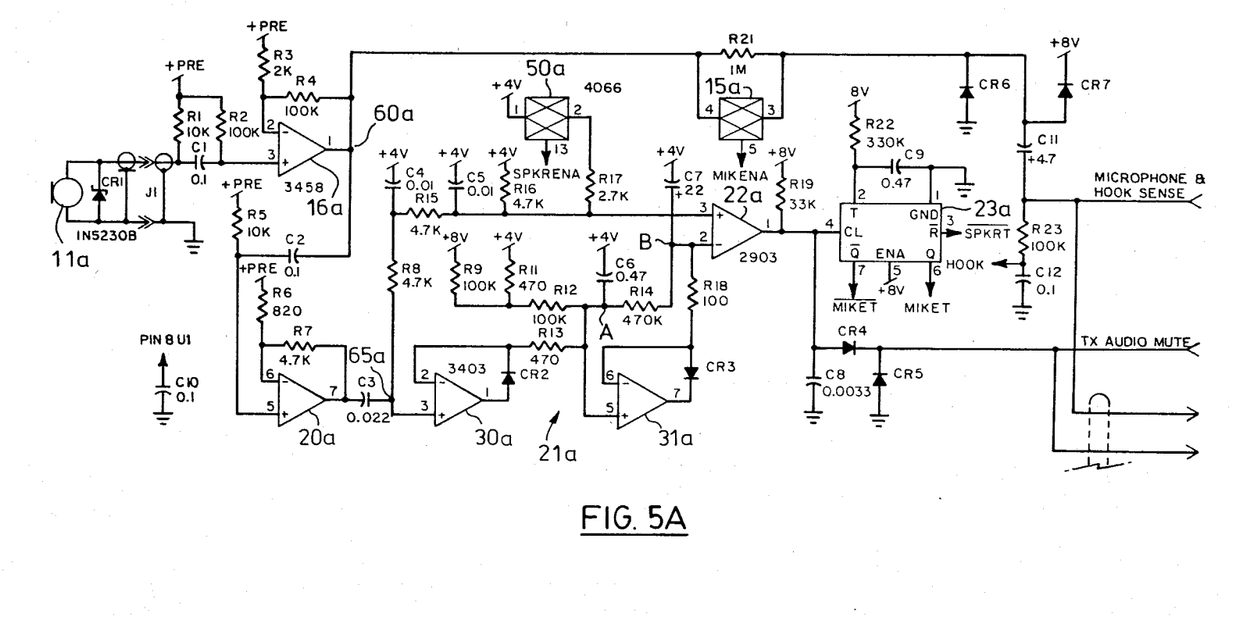
FIG. 5 is a complete circuit diagram of the system shown in FIG. 4.
Figure 5B:
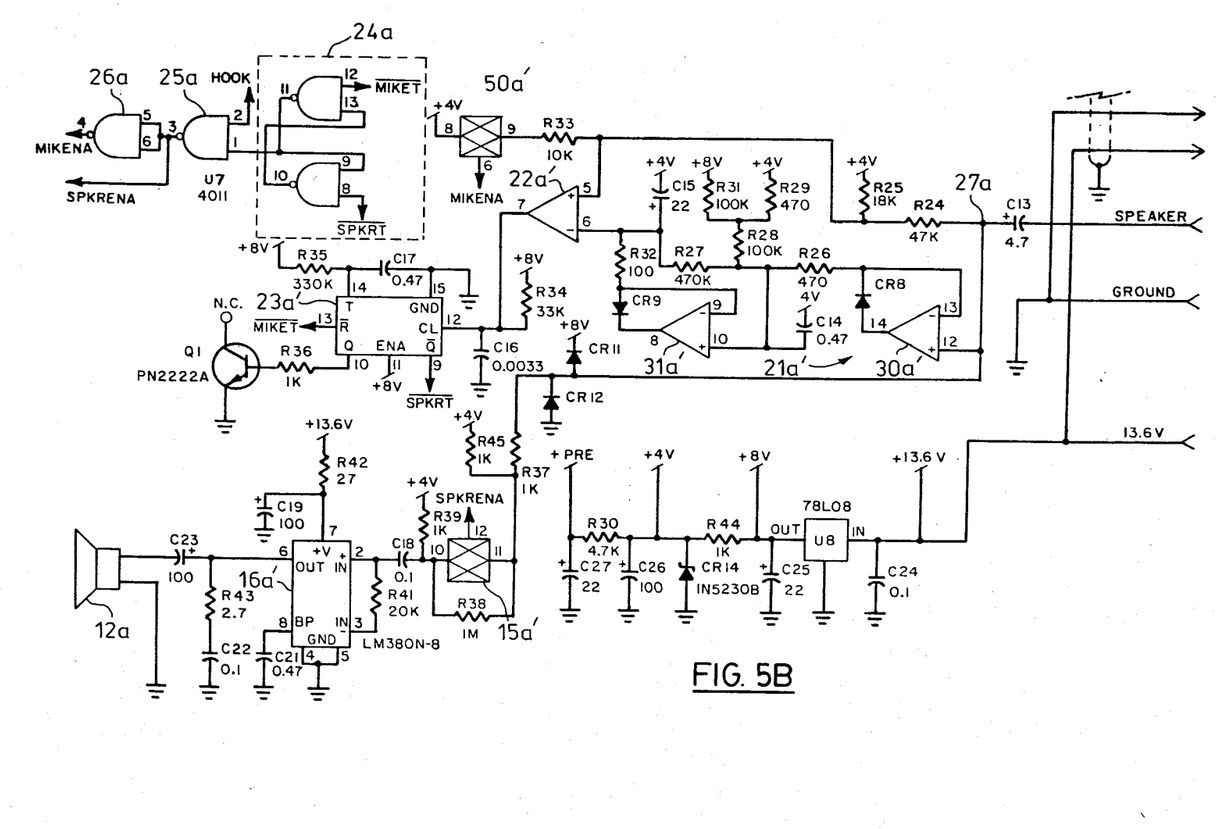

A complete schematic of a system embodying the present invention (station 10a only) is shown in FIG. 5. A somewhat simplified version of the system of FIG. 5 is shown in FIG. 4.

In FIG. 4 each of amplifiers 16a and 20a are operational amplifiers (op amps). Amplifier 16a' is an audio amplifier. Each network 21a, 21a' is a background level sensing network. Components 22a, 22a' are comparators. Components 23a, 23a' are retriggerable monostable timers. Component 24a is a NAND flip flop, while components 25a and 26a are a NAND gate and an inverter, respectively.

Attenuation is provided in the signal detection path from pin 7 of op amp 20a to pin 3 of comparator 22a by a resistor R8 and a resistor R16. Additional attenuation (delay) is provided by a resistor R17 that can be placed in circuit or out of circuit by means of a switch that may be in the form of a transmission gate (TG) 50a (see also FIG. 5).

Attenuation is provided in the signal detection path from terminal 27a to pin 5 of comparator 22a' by a resistor R24 and a resistor R25. Additional attenuation (delay) is provided by a resistor R33 that can be placed in circuit or out of circuit by means of a switch that may be in the form of a TG 50a'.

For the purpose of explaining the operation of the system of FIG. 4, the function of background sensing level networks 21a and 21a' can be disregarded, and it can be assumed that manually adjustable or preset voltages are applied to pin 2 of comparator 22a and pin 6 of comparator 22a'. These adjustable or preset voltages represent a background level (noise) that must be exceeded by a voice signal at pin 3 of comparator 22a or pin 5 of comparator 22a' to change the states of the comparators.

In describing the operation of the system shown in FIG. 4 it will be assumed that a voice signal at microphone 11a has been received previously and has established the microphone path as having been selected. Under these circumstances Q of component 24a is high, the output at the SPKRENA terminal is low and the output at the MIKENA terminal is high. The output at the SPKRENA terminal being low sets TG 50a to the open position and does not increase the attenuation afforded by resistors R8 and R16 which, in the embodiment illustrated, is ÷3 attenuation. The output at the SPKRENA being low also sets TG 15a' to the open position, meaning that no voice signals can be broadcast by loudspeaker 12a. The output at the MIKENA terminal being high sets TG 15a to the closed position, enabling voice signals received by microphone 11a to be transmitted to station 10b (not shown). The output at the MIKENA terminal being high also sets TG 50a' to the closed position, bringing resistor R33 into the attenuation circuitry and increasing by, say, a factor of two, the attenuation afforded by resistors R24 and R25, which may have been, say, ÷3. In other words, with resistor R33 out of circuit, there is a ÷3 attenuation factor, whereas with resistor R33 in circuit, there is a ÷6 attenuation factor.

With the system so set as described hereinbefore, assume that a voice signal is received at microphone 11a. It also will be received at terminal 27a because of the echo effect. It is essential to the proper functioning of the system that, under these circumstances, the system will maintain the microphone path as the correct path and will not choose the speaker path as the correct path. With ÷6 attenuation in the signal detection path between terminal 27a and pin 5 of comparator 22a' and only ÷3 attenuation in the signal detection path between pin 7 of op amp 20a and pin 3 of comparator 22a, the system is forced to retain its selection of the microphone path (TG 15a closed, TG 15a' open) because comparator 22a will produce a trigger signal at its pin 1 before comparator 22a' will produce a trigger signal at its pin 7. The reason for this has to do with the different attenuations in the two signal detection paths and will become more apparent hereinafter.

In any event, under the previously described circumstances, a trigger signal at CL of retriggerable monostable 23a before there is a trigger signal at CL of retriggerable monostable 23a' triggers on monostable 23a which, in turn, locks off monostable 23a, so that it can't be triggered on by the output it subsequently receives from pin 7 of comparator 22a'. When monostable 23a is triggered on, its Q NOT goes low setting Q of NAND flip flop 24a high. The result is maintenance of the original condition, i.e. SPKRENA being low and MIKENA being high.

On the other hand, if a valid signal is received at the SPKR IN terminal, its validity will be recognized by comparator 22a', and comparator 22a' will produce a trigger signal at its pin 7. Since no voice signal is being supplied from microphone 11a to pin 3 of comparator 22a at this time, comparator 22a will not produce any trigger signal. As a result, monostable 23a' is triggered on locking off monostable 23a and resetting the output of component 24a so that its Q is low. This, in turn, sets SPKRENA high and MIKENA low and changes the states of all of the transmission gates. More specifically, TG 15a opens, TG 15a' closes, TG 50a closes and TG 50a' opens. As a result, ÷6 attenuation is introduced into the signal detection path between pin 7 of op amp 20a and pin 3 of comparator 22a; the attenuation in the signal detection path between terminal 27a and pin 5 of comparator 22a' reverts from ÷6 to ÷3; the path for signals from microphone 11a is open; and the path for signals from the terminal SPKR IN to speaker 12a is closed.

An explanation now will be given, with reference to the preferred embodiment of the invention employing background level sensing systems 21a and 21a', how variation of the attenuation in the signal detection paths maintains the previously selected signal path, i.e., the signal path from microphone 11a or the signal path to loudspeaker 12a until an actual change in the signal path is required.

Referring to FIG. 5, op amp 30a, diode CR2, resistor R13 and capacitor C6 constitute a peak detector, the latter two components being the low pass and storage device of the peak detector. The output of op amp 30a and diode CR2 is, within very small tolerances, the output voltage expected from an ideal diode placed at pin 3 of op amp 30a, but the output signal of op amp 30a is buffered and is of low impedance to drive diode CR2, resistor R13 and capacitor C6.

The output of capacitor C6 (at terminal A) with respect to the +4 volt reference voltage thus is the approximate peak voltage of the voice frequency characteristic signals (when present), and when the voice input is between syllables and words, the peak voltage decays down to the peak value of the characteristic background noise.

Figure 6A:
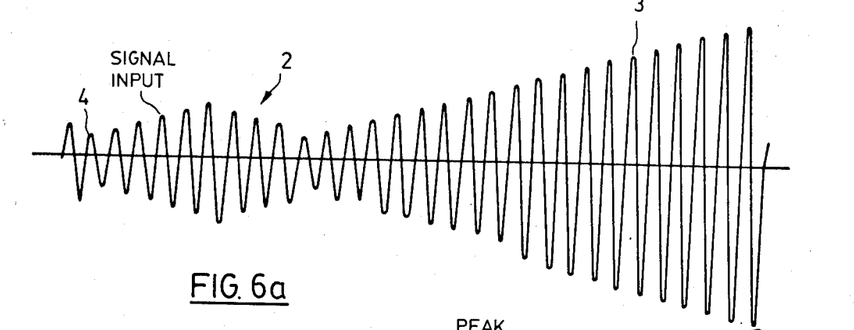
FIGS. 6a-6f are waveforms useful in understanding the operation of parts of the system shown in FIGS. 4 and 5.

Referring to FIG. 6a, the noise and voice signals which are applied to pin 3 of op amp 30a are shown by reference numeral 2, the largest amplitude portion 3 of these signals being voice signals and the other portion 4 of the signals being noise signals. The peak detected voltage is shown at 5 in FIG. 6b and appears at terminal A in FIG. 5.

An op amp 31a and diode CR3 functioning as an ideal diode together with a resistor R18 and a capacitor C7 constitute what could be referred to as a valley detector or an inverted peak detector. Capacitor C6 (terminal A) is connected to one input terminal (pin 5) of op amp 31a, and op amp 31a with diode CR3 thus tracks the lowest voltage that appears of capacitor C6 which, of course, is the background noise voltage. The buffered output of op amp 31a rapidly discharges capacitor C7 through diode CR3 to the minimum voltage on capacitor C6, i.e., the background noise voltage. The voltage on capacitor C7 at terminal B (FIG. 5) is shown at 6 in FIG. 6b.

Op amps 30a and 31a and their associated components constitute background level sensing network 21a.

Capacitor C7 can be charged in several ways, e.g., by a constant current; by a resistor to a constant voltage; by a resistor to a voltage proportional to the voltage (at terminal A) on capacitor C6; or by a current proportional to the voltage at terminal A. In the embodiment illustrated, which is the preferred embodiment, the technique of charging capacitor C7 by a resistor (R14) to a voltage proportional (1:1) to that at terminal A has been chosen.

The voltage decay of capacitor C6 to the minimum levels allowed by the noise peaks is via resistors R12 and R14, semiconductor leakage and bias currents. The voltage charging of capacitor C7 is via resistor R14, semiconductor leakage and bias currents. In order to prevent very small voice and noise peaks, as well as bias voltages, from activating the circuit, there may be provided a bias circuit (resistors R9 and R11) that provides a small bias which prevents comparator 22a, to be discussed hereinafter, from detecting below a minimum threshold.

Figure 6B:
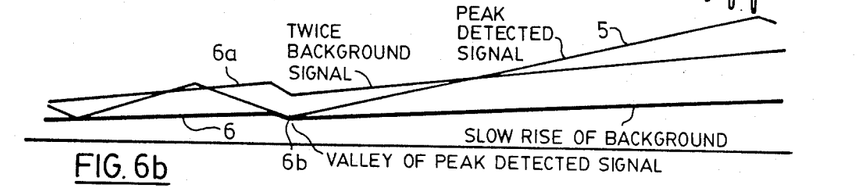

The result of the foregoing is that through the manipulation of the time constants in the circuit, different voice frequencies and noise frequencies can be detected with the valleys of the peak detected noise voltage, i.e., signal 6 in FIG. 6b, being placed on one input terminal (pin 2) of a comparator 22a.

The other input terminal (pin 3) of comparator 22a is connected via an attenuator and, optionally, a filter, constituted by resistors R8, R15 and R16 and capacitors C3, C4 and C5 to the output terminal (pin 7) of op amp 20a and thus receives attenuated and, optionally, filtered voice and noise signals.

Figure 6C:
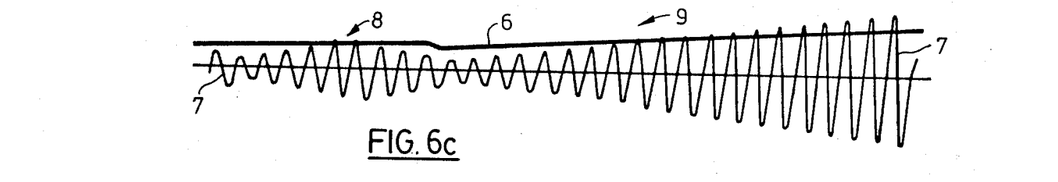
Figure 6D:
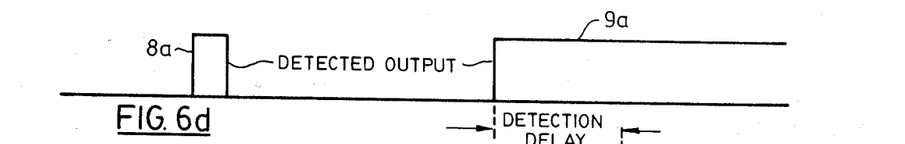

The voice and noise signals applied to pin 3 of comparator 22a are shown at 7 in FIG. 6c, while the background noise level (shown at 6 in FIG. 6b) also is shown at 6 in FIG. 6c. These two signals 6 and 7 are referenced to one voltage, in the present circuit +4 volts, making ratiometric comparison possible, this being achieved by comparator 22a. As a result, whenever signal 7 exceeds signal 6, as shown at 8 and 9 in FIG. 6c, there is an output signal, which is shown at 8a and 9a in FIG. 6d, at the output terminal (pin 1) of comparator 22a that signals this condition and thus the presence of, in this case, voice signals.

In the illustrated embodiment of this invention the voice and noise signals (signal 2) at the output terminal of op amp 20a are attenuated by a ratio of 1:3 before being applied to pin 3 of comparator 22a, as a result of which signal 7 is one third the amplitude of signal 2. If this were not done, the relative levels of signals 6 and 7 would be such that comparator 22a could not differentiate between noise signals, on the one hand, and voice signals alone or with noise signals, on the other hand, because signal 6 always would be below signal 7 in level. It should be appreciated, however, that the same desired result may be achieved by amplifying signal 6 to, say, enhance its amplitude by 100%, as shown at 6a in FIG. 6b, while not attenuating signal 7, or attenuating it to a lesser degree than otherwise. The sensitivity of the circuit is directly related to the degree of amplification and/or attenuation. Care must be taken, of course, not to attenuate signal 7 or amplify signal 6 to the point where the voice signals do not exceed the level of signal 6 and hence never are detected.

It will be apparent from the foregoing that background level sensing systems 21a and 21a' can be used to differentiate between low level noise signals and higher level voice signals, such that comparators 22a and 22a' will respond to voice signals, i.e., will produce an output in response to voice signals but not in response to lower level noise signals.

Figure 6E:
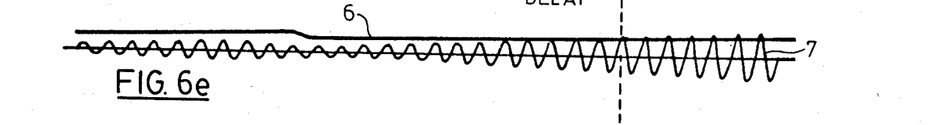
Figure 6F:
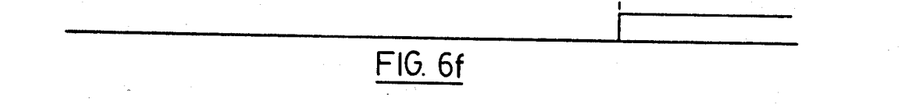

As previously pointed out, when one of comparators 22a and 22a', say, comparator 22a, provides an output before comparator 22a', its monostable 23a locks out monostable 23a', thus setting flip-flop 24a, TG 50a opens or remains open and TG 50a' closes or remains closed. Thus resistor R17 is out of circuit, while resistor R33 is in circuit. Consequently there is ÷3 attenuation in the path between terminal 65a (FIG. 5) and pin 3 of comparator 22a and ÷6 attenuation between terminal 27a and pin 5 of comparator 22a'. The result of this may be seen by comparing FIGS. 6c and 6e, the former showing signal 2 attenuated by a factor of three and the latter showing signal 2 attenuated by a factor of six. Obviously the point where signal 7 exceeds signal 6 occurs considerably early in time in FIG. 6c than in FIG. 6e, and this is what creates the required delay in the signal detection path (see FIGS. 6d and 6f). In other words, with the example chosen, a voice signal (having a non-step response) at microphone 11a always will cause comparator 22a to provide an output before comparator 22a' because of the ÷3 attenuation in the signal detection path between terminal 65a and pin 3 of comparator 22a creating less of a delay than that created by the ÷6 attenuation in the signal detection path between terminal 27a and pin 5 of comparator 22a'. The slope of the rising voice signal thus causes the difference in delay in the detection circuit.

It will be understood, of course, that while the invention has been described herein in connection with a telephone communication system wherein the two communicating stations are wired together, the invention is equally applicable to any mobile system.

It also should be appreciated that the attenuating networks used herein as delay networks 19a, 19a' (FIG. 3) merely constitute one form of delay network that could be employed. Delay lines might be used, for example, these being capable of being by-passed by suitable switching devices, and the delay may be introduced anywhere between terminal 60a (FIG. 5) and pin 3 of comparator 22a and anywhere between terminal 27a and pin 5 of comparator 22a'. It also may be possible to employ a single delay system or component, rather than the two shown in FIG. 3, and employ suitable switching devices to switch it either into the location of delay network 19a in FIG. 3 or the location of delay network 19a' in FIG. 3.

While the use of a retriggerable monostable timer as a time-out device for voice characteristic timing is common, a feature of the preferred embodiment of the invention shown in FIGS. 4 and 5 resides in the employment of a dual monostable timer 23a, 23a', or two separate timers interlocked so that the operation of one is dependent upon the other timing out. In this respect, pulses applied to pin 4 of monostable 23a will be allowed to discharge timing capacitor C9 (FIG. 5) if the interlock line (NOT SPKRT) (pin 3 of monostable 23a) is not held low. For the period that capacitor C9 is below the internal timing threshold, the output at pin 7 (NOT MIKET) of monostable 23a will be held low, thus preventing the pulses applied to pin 12 of monostable 23a' from discharging capacitor C17 (FIG. 5). Thus the activation indication from one retriggerable monostable, is connected to the disable of the other monostable, as may be seen by the connection between pin 7 of monostable 23a and pin 13 of monostable 23a' and the connection of pin 9 of monostable 23a' to pin 3 of monostable 23a.

The time out of each monostable is chosen for the best effect on normal speech patterns. It is set for monostable 23a by the values of capacitor C9 and resistor R22 and for monostable 23a' by the values of capacitor C17 and resistor R35. Desirably it is about 150 milliseconds.

It should be noted that the output of comparator 22a is timed by a timing network consisting of a resistor R19 and a capacitor C8, so that a set period of comparator output is needed to activate the following circuitry, i.e. monostable 23a. A similar timing network consisting of a resistor R34 and a capacitor C16 is provided for comparator 22a'. The delay now put in the circuit is part of the filtering action, not allowing frequencies above, say, 5 KHz to activate the following circuitry. As voice characteristics have a slow rising amplitude, the effect of the detection and lower ratios to the noise background will allow the direction having the signal source decision and, hence, the lower ratio of voice to noise, to activate first.

The holding of the decision for the last direction to be in use is necessary for the proper operation of the communications system. The direction that last had the control will need a lower signal level than the other direction, for reasons previously explained, allowing the circuit to differentiate between two signals that otherwise would be nearly the same or of the same characteristics.

As previously disclosed, component 24a is a NAND flip flop. The activation of either of the direction monostables 23a, 23a' causes the output at pin 11 of NAND flip flop 24a to reflect the last direction in control. The added signal labelled HOOK is used to lock out one direction without qualification.

The time out of the monostables and the interlocking of the monostables selects the period of time that a decision must be held for. After the time out of the monostables, the direction decision may be changed if the opposite monostable than before is activated.

As aforementioned, direction can be controlled by the externally generated HOOK voltage. The disabling of the further retriggering of a monostable is one way of preventing further signals from activating the path decision circuitry without necessarily changing the decision latching and output. The circuitry used for this consists of a logic level input driving diode CR4 and a capacitor C8 connected to pin 4 of monostable 23a. The holding of the logic level to a low prevents the charging of capacitor C8 via resistor R19.

Strictly by way of example, the following table lists various components and parameters that may be employed in the system of FIG. 5.

| Component | Type | +8 v | Ground |
|---|---|---|---|
| 16a, 20a | MC 3458P1 | 8 | 4 |
| 30a, 31a 30a', 31a' | MC 3403P | 4 | 11 |
| 15a, 15a' 50a, 50a' | HCC/HCF 4066 | 14 | 7 |
| 22a, 22a' | LM 2903N | 8 | 4 |
| 23a, 23a' | HCC/HCF 4538 | 16 | 8 |
| 16a' | LM 380N-8 | SHOWN | |
| U7 | CD 4011 | 14 | 7 |
| U8 | uA 78L08 | — | — |

While preferred embodiments of this invention have been disclosed herein, those skilled in the art will appreciate that changes and modifications may be made therein without departing from the spirit and scope of this invention as defined in the appended claims.

The embodiments of the invention in which an exclusive property or privilege is claimed are defined as follows:

1. In a two way telephone communication system including a first station having a first signal receiving means, a second signal receiving means, signal broadcasting means, a first signal path connected to said first signal receiving means for transmitting a signal received by said first signal receiving means to a location for transmission of said signal to another station, a second signal path connected between said second signal receiving means and said signal broadcasting means for carrying a signal received by said second signal receiving means from another station to said signal broadcasting means, switching means in each of said signal paths for selectively enabling one of said signal paths and disabling the other of said signal paths, control means for switching said switching means, first and second signal detection paths associated respectively with said first signal path and with said second signal path and connected respectively between said first signal path and said control means and between said second signal path and said control means, said first signal detection path having first signal detection means for detecting signals in said first signal path and for generating in response to detected signals in said first signal path an activating signal for activation of said control means, said second signal path having second signal detection means for detecting signals in said second signal path and for generating in response to the detected signals in said second signal path an activating signal for activation of said control means, said control means responding to the signal detection path which first generates an activating signal to enable the signal path associated with the signal detection path which first delivers an activating signal, the improvement comprising:

signal delay means in one of said signal detection paths for delaying generation of an activating signal in said one of said signal detection paths when said signal delay means are enabled; and, delay enabling means responsive to the presence of a signal in one of said signal paths for selectively enabling or disabling said signal delay means.

2. A two way telephone communication system according to claim 1 wherein said delay enabling means enable said signal delay means in response to the enabled state of and continued presence of a signal in the signal path associated with the other of the signal detection paths and otherwise disable said signal delay means.

3. A two way telephone communication system according to claim 2 wherein:

the signal detection means of said one of said signal detection paths comprises means for generating an activating signal in response to the magnitude of signals present in the associated signal path; and, said signal delay means comprise attenuating means for attenuating the magnitude of said signals in the associated signal path as detected by said signal detection means of said one of said detection paths.

4. In a two way telephone communication system including a first station having a first signal receiving means, a second signal receiving means, signal broadcasting means, a first signal path connected to said first signal receiving means for transmitting a signal received by said first signal receiving means to a location for transmission of said signal to another station, a second signal path connected between said second signal receiving means and said signal broadcasting means for carrying a signal received by said second signal receiving means from another station to said signal broadcasting means, switching means in each of said signal paths for selectively enabling one of said signal paths and disabling the other of said signal paths, control means for switching said switching means, first and second signal detection paths associated respectively with said first signal path and with said second signal path and connected respectively between said first signal path and said control means and between said second signal path and said control means, said first signal detection path having therein first signal detection means for detecting signals in said first signal path and for generating in response to detected signals in said first signal path an activating signal for activation of said control means, said second signal path having therein second signal detection means for detecting signals in said second signal path and for generating in response to the detected signals in said second signal path an activating signal for activation of said control means, said control means responding to the signal detection path which first generates an activating signal to enable the signal path associated with the signal detection path which first delivers an activating signal, the improvement comprising:

first signal delay means in said first signal detection path for delaying generation of an activating signal in said first signal detection path whenever the first signal delay means are enabled;

second signal delay means in said second signal detection path for delaying generation of an activating signal in said second signal detection path whenever the second signal delay means are enabled;

delay control means for selectively enabling and disabling said first and second signal delay means, said delay control means responding to the presence of a signal in an enabled one of said signal paths by enabling the signal delay means in the signal detection path associated with the disabled one of said signal paths.

5. A two way telephone communication system according to claim 4 wherein:

said first signal detection means comprise means for generating an activation signal response to the magnitude of signals detected in said first signal path;

said first delay means comprise first attenuating means for attenuating the magnitude of said first signal path signal as detected by said first signal detection means; and, said second signal detection means comprise means for generating an activation signal in response to the magnitude of signals detected in said second signal path; and;

said second delay means comprise second attenuating means for attenuating the magnitude of said second signal path signals as detected by said second signal detection means.

6. A two way telephone communication system according to claim 5 wherein each of said first and second attenuating means has a higher degree of attenuation and a lower degree of attenuation, one of said attenuating means being in its mode of lower attenuation whenever the other of said attenuating means is in its mode of higher attenuation.

7. A two way telephone communication system according to claim 6 wherein said higher degrees of attenuation of said first and second attenuating means are equal and said lower degrees of attenuation of said first and second attenuating means are equal.

8. A two way telephone communication system comprising a station having a first signal path for signals to be transmitted to another station, a second signal path for signals received from another station, switching means for selectively enabling one of said signal paths and disabling the other of said signal paths, and automatic direction decision means for controlling said switching means to either maintain the one of said signal paths that is enabled in an enabled state or to change the state thereof to disabled, said automatic direction means including control means for switching said switching means, a first signal detection path connected between said first signal path and said control means and including therein means for deriving and supplying to said control means signals indicating the presence of a signal in said first signal path, a second signal detection path connected between said second signal path and said control means and including therein means for deriving and supplying to said control means signals indicating the presence of a signal in said second signal path, the control means responding to the signal detection path which first indicates the presence of a signal in said signal paths to cause the switching means to enable the signal path to which said signal detection path which first indicates the presence of a signal in said signal paths is connected, signal delay means in one of said signal detection paths for delaying the supplying to said control means of a signal indicating the presence of a signal in the signal path to which said one signal detection path is connected, and means for selectively enabling said delay means in response to enablement of, and continued presence of a signal in, the signal path to which the other of said signal detection paths is connected.

* * * * *